350-3.74 SR

XR 3,631,411

SEARCH ROOM

[11] 3,631,411

[72] Inventor Walter Frank Kosonocky Skillman, N.J.
[21] Appl. No. 866,645
[22] Filed Oct. 15, 1969
[45] Patented Dec. 28, 1971
[73] Assignee RCA Corporation

[54] ELECTRICALLY AND OPTICALLY ACCESSIBLE MEMORY
16 Claims, 9 Drawing Figs.

[52] U.S. Cl. ........ 340/173 LS, 250/219, 307/311, 350/3.5
[51] Int. Cl. ........ G11c 11/42
[50] Field of Search ........ 340/173 LM, 173 LS; 307/311; 250/219

[56] References Cited
UNITED STATES PATENTS

| | | | |
|---|---|---|---|
| 2,727,685 | 12/1955 | Wilson | 340/173 |
| 3,341,274 | 9/1967 | Marks | 350/267 |

*Primary Examiner*—Terrell W. Fears
*Attorney*—H. Christoffersen

ABSTRACT: A computer memory system is disclosed which includes a randomly and electrically accessible semiconductor "page" memory. The semiconductor page memory is an array of memory units each of which includes an electrically accessible flip-flop for storing a binary information bit. In addition, each flip-flop is provided with a photodiode by which the flip-flop can be set in response to received light, and is provided with a liquid crystal light valve controlled by the electrical state of the flip-flop. The page array of memory units is constructed as a metal oxide semiconductor (MOS) integrated circuit. Each memory unit includes a flip-flop transistor having a drain which is extended over an area of opposite-conductivity material to form a photodiode. A liquid crystal material and a transparent electrode are positioned over the photodiode to form a light vale. The page array of memory units is used as a page-at-a-time electrical input-output unit for a great many pages of information stored optically on an erasable holographic storage medium.

3631411
OR IN 340/173LS

INVENTOR.
Walter F. Kosonocky
BY
Carl V. Olson
ATTORNEY

Patented Dec. 28, 1971 3,631,411

4 Sheets-Sheet 2

INVENTOR.
Walter F. Kosonocky
BY
Carl V. Olson
ATTORNEY

INVENTOR.
*Walter F. Kosonocky*
BY
Carl V. Olson

INVENTOR.
Walter F. Kosonocky
BY
Carl V. Olson
ATTORNEY

ELECTRICALLY AND OPTICALLY ACCESSIBLE MEMORY

BACKGROUND OF THE INVENTION

Computer systems customarily include a high-speed electrical, random-access memory for information operated on by the central processor, In addition, computer systems include mass storage memories such as magnetic drums and magnetic tape stations. In the operation of the computer system, information is frequently transferred between the high-speed random-access memory and the much slower mass storage devices. It has been proposed that magnetic drums and tape stations be replaced by optical recording means. The storage of a massive quantity of binary information in a relatively small space is possible using an optical storage medium, such as manganese bismuth, in a system in which the optical information is stored as a hologram. In a computer system including an optical storage medium, it is necessary provide means to translate a "page" of electrically stored information into a light pattern for recording on the optical storage medium. Means are also necessary to translate a light pattern reproduced from the optical storage medium into a page of electrically stored information for use by the computer processor.

SUMMARY OF THE INVENTION

It is an object of this invention to provide an improved integrated circuit semiconductor "page" array of memory units including bistable memory element which are accessible by a computer processor. The semiconductor page array of memory units is constructed so that each bistable memory element is provided with a light valve controlled by the electrical state of the memory element, whereby the information in the semiconductor memory can be rapidly transferred optically to any one of many small areas on an optical storage medium. Each memory element also includes a photosensor connected so that when any page record on the optical storage medium is illuminated, the image of light valves represented thereby is projected onto the array of photosensors to transfer the page of information from the optical storage medium to the page array of semiconductor memory elements.

DESCRIPTION OF FIGS. 1 through 5

Figure 1:
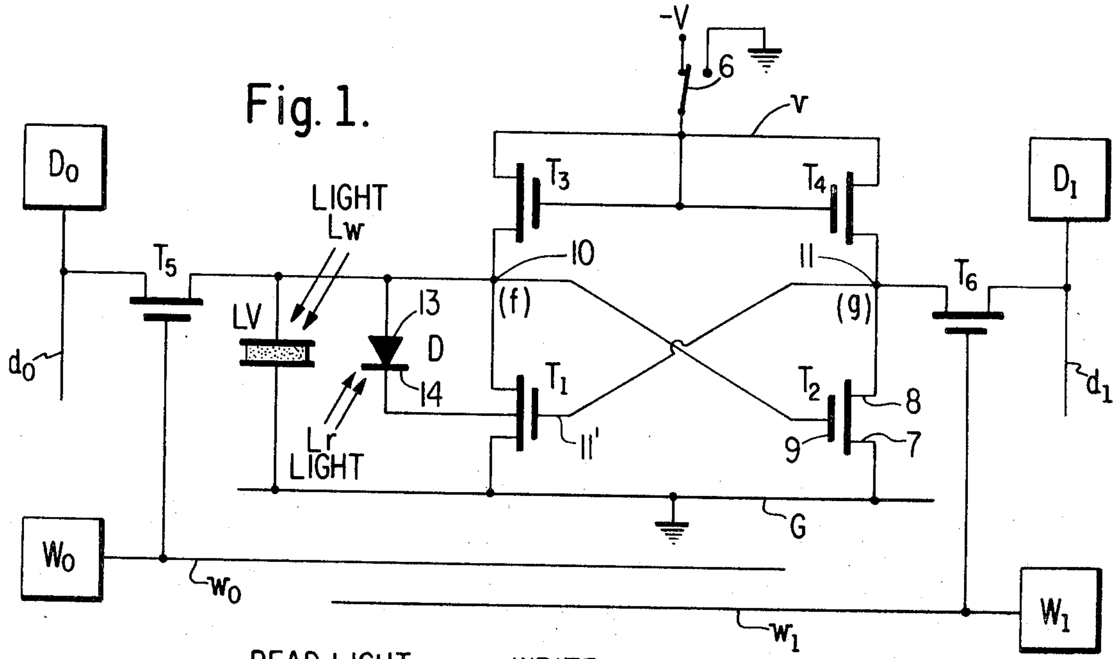
FIG. 1 is a circular diagram of a circuit diagram of an electrically and optically accessible memory unit constructed according to the teachings of the invention.

Referring now in greater detail to FIG. 1, there is shown an electrically and optically settable bistable circuit or flip-flop, in addition a liquid-crystal light valve. The flip-flop portion of the circuit includes crosscouple transistors $T_1$ $T_2$, and load impedance transistors $T_3$ and $T_4$ for transistors $T_1$ and $T_2$, respectively. The load impedance transistors $T_3$ and $T_4$ are connected through lead $v$ and through a switch 6 to a negative terminal $-V$ of a potential source having its other terminal connected to a reference of ground potential point in the circuit.

The transistors $T_1$ and $T_2$, a source 7, a drain 8, and a gate electrode 9. The described circuit including transistors $T_1$ and $T_4$ constitutes a known bistable circuit or flip-flop.

The flip-flop is shown connected as one memory cell in a n array of memory cells which includes means of electrically writing an information bit from the memory cell. The accessing means includes a digit drive and sense circuit $D_0$ connected to a digit column line $d_0$, and a digit driver and since circuit $D_1$ connected to a digit column line $d_1$. The accessing means also includes a word driver $W_0$ connected to a word row line $w_0$, and a word driver $W_1$ connected to a word row line $w_1$.

The digit line $d_0$ is coupled through a gate transistor $T_5$ to the drain or output 10 of transistor $T_1$ and to the gate electrode 9 of transistor $T_2$. The gate transistor $T_5$ is enabled by a signal applied to the gate electrode thereof from the word line $w_0$. The digit line $d_1$ is coupled through a gate transistor $T_6$ to the drain or output 11 of transistor $T_2$ and to the gate electrode of transistor $T_1$ gate transistor $T_6$ is enabled by a signal from the word line $w_1$.

The circuit of FIG. 1 includes a photosensor which is shown as a PN-photodiode D having an anode 13 connected to the output 10 of transistor $T_1$, and having a cathode 14 connected to the bulk silicon substrate of transistor $T_1$. When the circuit is built in integrated form, the bulk silicon substrate may be common also to transistors $T_2$ through $T_6$. The photodiode may be replaced by a phototransistor (not shown). The circuit also includes a liquid-crystal light valve LV connected between the output 10 of transistor $T_1$ and ground G.

Figure 4:
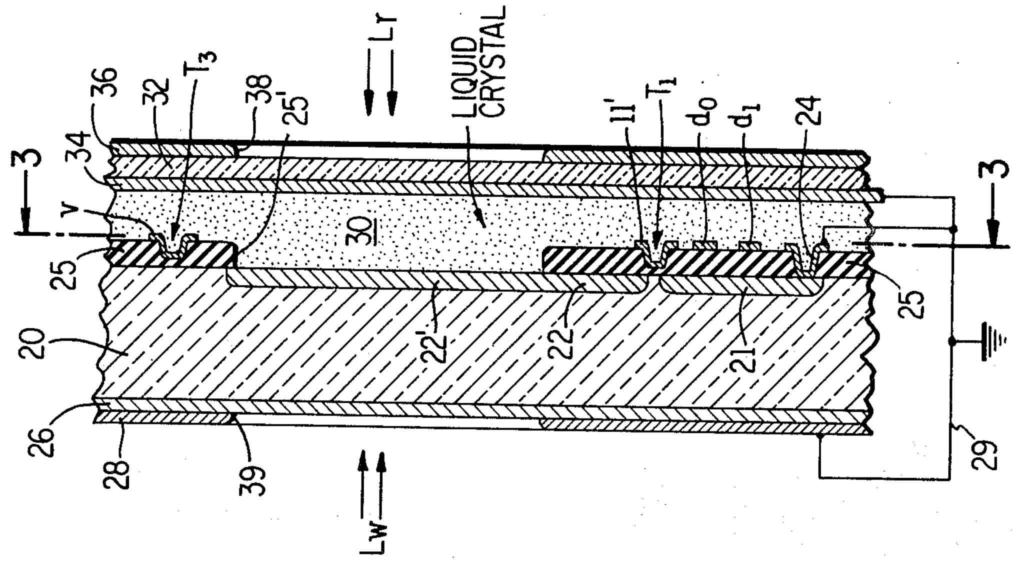
FIG. 4 is a sectional view of an MOS integrated circuit embodiment of the circuit of FIG. 1 taken along the line 4—4 of FIG. 3.
Figure 3:
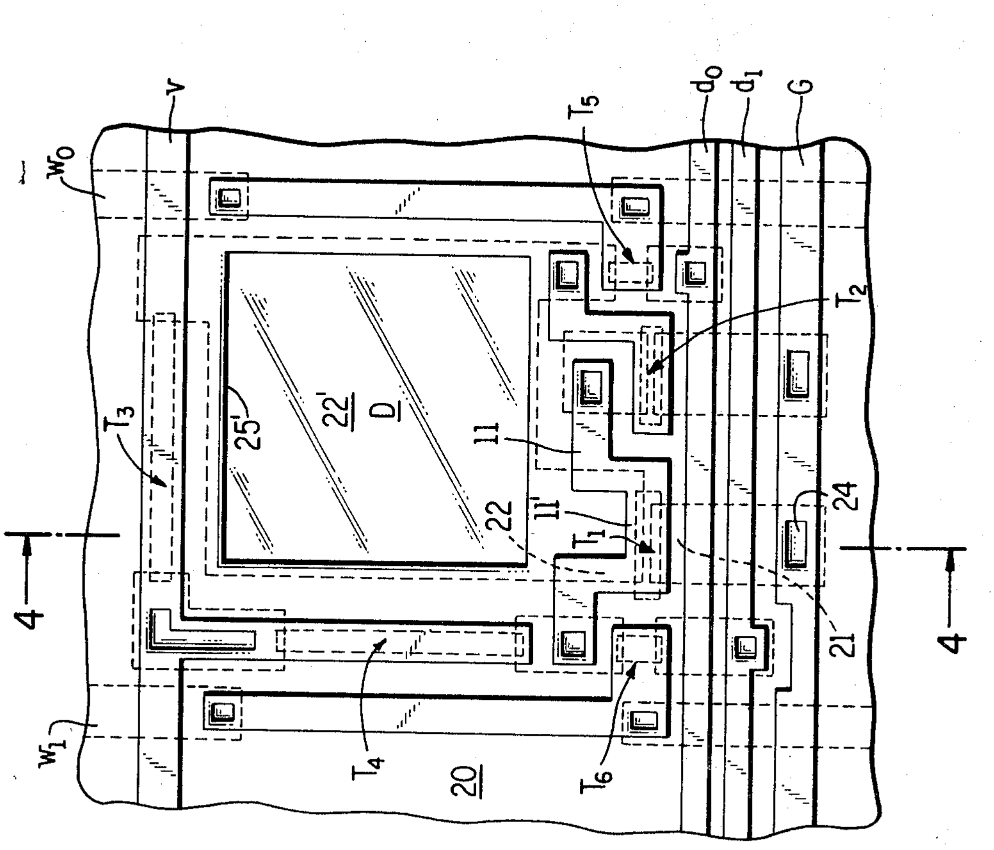
FIG. 3 is a plan view of an MOS integrated circuit embodiment of a portion of the circuit of FIG. 1.

FIGS. 3 and 4 show a physical construction of the electrically and optically accessible memory unit as shown in circuit diagram form in FIG. 1. The circuit is constructed on an N-type silicon substrate 20 in which regions of P+ silicon are formed to serve as source and drain elements of the transistors. The P+ regions and the regions therebetween are covered with a layer 25 of silicon dioxide, $SiO_2$, to provide electrical insulation. Conductive gate electrodes are formed over the regions between respective sources and drains Electrical conductors, formed on the silicon dioxide layer, include contact regions extending through openings in the silicon dioxide layer to the P+ regions below.

The transistors $T_1$ through $T_6$ shown in FIG. 1 are indicated in FIG. 3 by the same respective designations $T_1$ through $T_6$. The transistor $T_1$ is seen from FIGS. 3 and 4 to include a P+ type source 21 separated from a P+ type drain 22. A thin silicon dioxide layer overlying the area between the source 21 and the drain 22 forms an insulating region over which is positioned a conductive gate electrode 11'. The digit conductor lines $d_0$ and $d_1$ are shown on top of the silicon dioxide layer 25. A ground line G is shown on the silicon dioxide layer with a contact region 24 extending through the silicon dioxide layer to make electrical contact with the P+ material forming the source 21 of transistor $T_1$. The construction of load impedance transistor $T_3$ is also shown in both of of FIGS. 3 and 4.

The drain 22 of transistor $T_1$ as shown in FIGS. 3 and 4 is a P+ material which is extended along the N-type substrate 20 to a relatively large square area designated 22'. The P+ material in the area 22' forms the anode 13 in FIG. 1 of the photodiode D. The N-type material 20 forms the cathode 14 in FIG. 1 of the photodiode D. The large surface of theP+ material 22' is shown as visible through an opening 25' in the silicon dioxide layer. The material 22' is not covered with silicon dioxide because it serves also as an electrode of the liquid-crystal light valve LV.

The top of the integrated circuit shown in FIG. 3 is covered by a layer of a liquid crystal composition which is shown at 30 in the sectional view of FIG. 4. The liquid crystal composition, to be described later, is held in place by means of a glass sheet 32 having a transparent conductive coating such as tin oxide at 34 on the side of the glass contacting the liquid crystal composition. The exposed side of the glass plate 32 is provided with an opaque mask 36 of a material such as aluminum and having an opening 38 to permit the passage of light $L_w$ to, and through, the liquid crystal composition.

The bottom surface of the N-type silicon 20 may be provided with a thin N+ layer 26 on which is formed a metal ground layer 28. The metal ground layer 28 is externally connected by a wire 29 to the ground conductor G on the top surface of the integrated circuit. The metal ground layer 28 is shown in FIG. 4 to have an opening 39 therein which is coextensive with the openings 38 in mask 36 and the area 22′ of the photodiode D. The openings 39 in the metal ground layer 28 is provided to permit incident light $L_w$ of suitable infrared wavelength to pass completely through the integrated circuit when permitted to do so by the state of the liquid crystal composition 30. The opening 39 is not needed if the light valve is to be used in a light-reflecting mode. In this case, partial light reflection is inherently provided by the P-type layer 22′ of the diode, and may be enhanced by a partially reflecting film deposited on the layer 22′.

The liquid crystal 30 may be a nematic mesophase composition. "Mesophase" relates to a state of matter intermediate between the crystalline solid and the isotropic liquid. A common name for this state is "liquid crystal." The term nematic refers to a specific type of liquid crystal. Compositions having a mesomorphic state or mesophase have two "melting" points. The first melting point is at the transition temperature of the crystalline solid state and the mesomorphic state, the second melting is at the transition temperature of the mesomorpic state and the isotropic liquid. Between these temperatures the compound exists in the mesomorphic or liquid crystalline state in which it behaves both as a liquid, in that is flows and exists in drops that coalesce, and as a solid in that it is optically or electrically anisotropic and has a structural order in one or two dimensions.

Nematic liquid crystals are electrically and magnetically anisotropic. On surfaces such as glass, the nematic phase generally adopts a characteristic threaded texture, visible between crossed polaroids. This texture is thought to consist of many domains or clusters in which the liquid crystal molecules have a fixed orientation. According to the cluster theory of nematic liquid crystals, the clusters are normally randomly oriented accounting for the light-scattering properties and for the appearance of a fairly large volume. Each cluster is birefringent and is about $10^{-5}$ cm. in size. Upon applying an electric or magnetic field to a layer of mesomorphic crystals the clusters tend to become oriented in a particular direction thereby changing the light-scattering and birefringent properties of the layer. The degree of orientation is dependent upon the magnitude of the applied filed. Hence, light-scattering properties and birefringent properties of a volume of nematic liquid crystalline material can be modulated with an electric or magnetic field. These properties are useful in electro-optical devices, such as in Kerr effect devices, in devices wherein the plane of polarization of a light beam is rotated and in optical display devices wherein the degree of scattering of a transmitted or reflected light beam is modulated.

The composition may be one of a family of nematic liquid crystal compositions represented by the formula

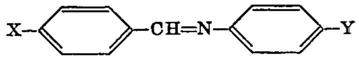

wherein; X and Y are radicals chosen from the group consisting of saturated alkoxy radicals having from one to nine carbon atoms and saturated acyloxy radicals having from two to five carbon atoms such that, when X is a saturated alkoxy radical, Y is a saturated acyloxy radical and vice versa. The saturated alkoxy radical has at least three carbon atoms when the saturated acyloxy radical has only two carbon atoms. The composition may include up to 60 weight percent of p-(anisalamino)-phenylacetate, based on the total weight of said composition. An acyloxy radical is a radical of an alphatic ester having the general formula $$R-\overset{\overset{\textstyle O}{\|}}{C}-O-$$

The oxygen bonded to the carbon atom of the radical with a single bond is also bonded to an aromatic ring, for example, in

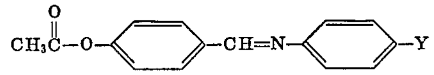

One of the features characterizing the composition is the relatively low minimum operating temperature due to the low crystal-mesomorphic transition temperatures of members included in the family of compositions. Mixtures have been found which have a crystal-mesomorphic transition temperature below room temperature. Another feature is the wide temperature range in which the novel devices can be used. One example is a compound having a crystal-mesomorphic transition temperature of about 50° C. and a mesomorphic-isotropic liquid transition temperature of 113° C.

Figure 5:
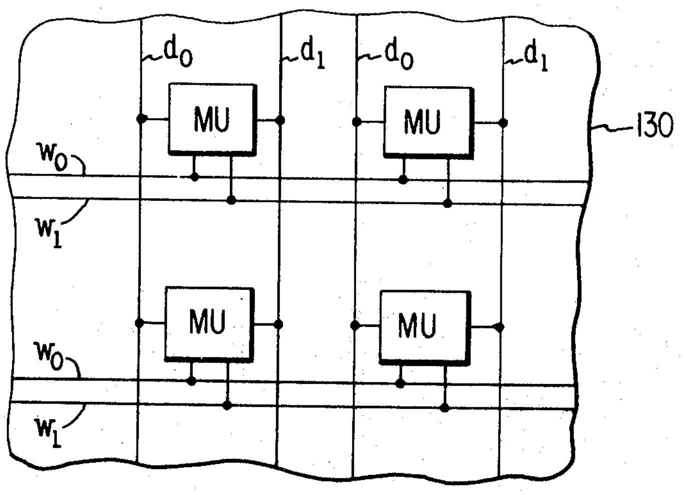
FIG. 5 is a diagram illustrating a page array of memory units of the type shown by the circuit of FIG. 1.

FIG. 5 is a diagram of an array of memory units as shown in FIG. 1. That is, an integrated circuit array 130 includes many memory units MU arranged in rows and columns. Each of the four memory units MU shown includes the transistors $T_1$ through $T_6$ of FIG. 1, and includes an associated photodiode D and an associated light valve LV. All the memory units in a given column are connected through a set of column digit lined $d_0$ and $d_1$ to a respective set of digit circuits $D_0$ and $D_1$. In like manner, the memory units in a given row are connected by word lines $w_0$ and $w_1$ to respective word drivers $W_0$ and $W_1$.

The page array 130 of memory units includes a conventional random-access semiconductor memory plane which is accessed electrically in the usual manner by a computer processor. The accessing means includes conventional memory addressing circuits, a data register, and control circuits, all of which are well known and need not be described here.

While the array 130 has been described as being constructed using P-MOS field effect transistor technology, it will be understood that it can also be constructed by those skilled in the art using N-channel MOS, or complementary MOS technology. Further, the foregoing constructions can be of the bulk silicon type or the silicon-on-sapphire type.

OPERATION OF CIRCUIT OF FIG. 1

The operation of the circuit of FIG. 1 will now be described with references to the waveforms of FIG. 2. The flip-flop is assumed at time $t_0$ to be in its set condition with transistor $T_1$ conducting and transistor $T_2$ cut off. Since the circuit is responsive to an input light signal $L_r$ only when the flip-flop is in its reset state, the flip-flop must be electrically reset as a matter of routine before an input light signal is applied. This is accomplished at time $t_1$ by applying a negative pulse, FIG. 2c, to the digit line $d_0$ concurrently with a negative pulse, FIG. 2b, to the word line $w_0$ to enable gate transistor $T_5$. The negative pulse passed by gate transistor $T_5$ is applied to output 10 of transistor $T_1$ and to the gate electrode 9 of transistor $T_2$. This makes transistor $T_2$ conductive, and through regenerative action of the cross-coupled transistors, makes transistor $T_1$ nonconductive. The flip-flop is then in its reset state with $-v$ voltage at the output 10 of transistor $T_1$ and across the photodiode D. The speed of resetting is increased by simultaneously applying waveform 2d to the word line $w_1$ and waveform 2e to digit line $d_1$. The photodiode is now charged to the $-v$ voltage.

In order to make the circuit sensitive to light, it is necessary to isolate the diode D to prevent its being maintained in a charged state by current from any source. After time $t_2$, current is no longer supplied from digit line $d_0$ through gate transistor $T_5$, and the diode D can be isolated by using switch 6 to interrupt the $-V$ bias source, FIG. 2a, at a time prior to time $t_2$ when input light may be received. In order to permit the transistor $T_2$ to respond to a change in voltage on its gate electrode, a $-v$ voltage, FIG.2e, is applied to digit line $d_1$ at time $t_2$ ($T_6$ is already enabled from word line $w_1$, FIG. 2d). This, in effect, substitutes gate transistor $T_6$ for transistor $T_4$ as a load for transistor $T_2$.

If no input light signal impinges on the diode D during the interval between $t_2$ and $t_4$, the charge on the diode is only slightly diminished by leakage as shown by the dashed line 15 in FIG.2*f*. Then, at time $t_5$, when the $-V$ bias is restored, the flip-flop remains in its reset state.

On the other hand, if an input light signal impinges on diode D after time $t_2$, the diode is rendered conductive, and the charge across the diode is reduced as shown by the line 16 in FIG. 2*f*. This voltage is coupled to the gate electrode of transistor $T_2$, and the reduction in voltage reduces the conductivity of transistor $T_2$ until the threshold voltage of $T_1$ is reached at time $T_3$. Then, by regenerative action, trnasistor$T_1$ is rendered conductive and the flip-flop is in its set state. The set state of the flip-flop is maintained by restoring the $-V$ bias source at time $t_4$ prior to the removal at time $t_5$ of $-v$ voltage from digit line $d_1$, FIG. 2*e*, and from word line $w_1$. FIG. 2*d*.

The operation of the circuit of FIG. 1 has been described for the condition when a binary light signal is directed to the photodiode D to result in the setting of the flip-flop when the light signal represents a binary "1." In the absence of an input light signal, the flip-flop is maintained in its"O" state.

The operation of the circuit of FIG. 1 will now be described for the condition when a light beam is directed to the liquid crystal light valve LV and is transmitted or dispersed, depending on the state of the flip-flop. When the flip-flop is in the "1" state, the point 10 at the output of transistor $T_1$ is at 0 volts and the voltage at point 11 at the output of transistor $T_2$ is at $-v$ volts, as shown at time $t_5$ on the waveforms of FIGS. 2*f* and 2*g*. Under this condition, there is no voltage across the liquid crystal light valve LV. The light valve LV then remains transparent and the light beam is transmitted through the light valve as a "1" optical information signal.

If the flip-flop is in the "0" state at time $t_5$, the point 10 is at $-v$ volts as represented at 17 in FIG. 2*f*. This negative voltage present across the liquid crystal light valve LV causes the liquid crystal to disperse or scatter or attenuate light of an incident light beam. Depending on the electro-optical characteristics of the particular liquid crystal composition employed, it may be desirable to increase the negative voltage across the light valve to a more negative voltage $V_2$. This is accomplished by increasing the source voltage $-V$ to a more negative valve in the interval between $t_6$ and $t_7$ as shown in FIG. 2*a*. The more negative source voltage $V_2$ appears across the light valve LV and produces a greater degree of scattering or attenuation of the incident beam.

DESCRIPTION OF FIGS. 6 THROUGH 9

Figure 6:
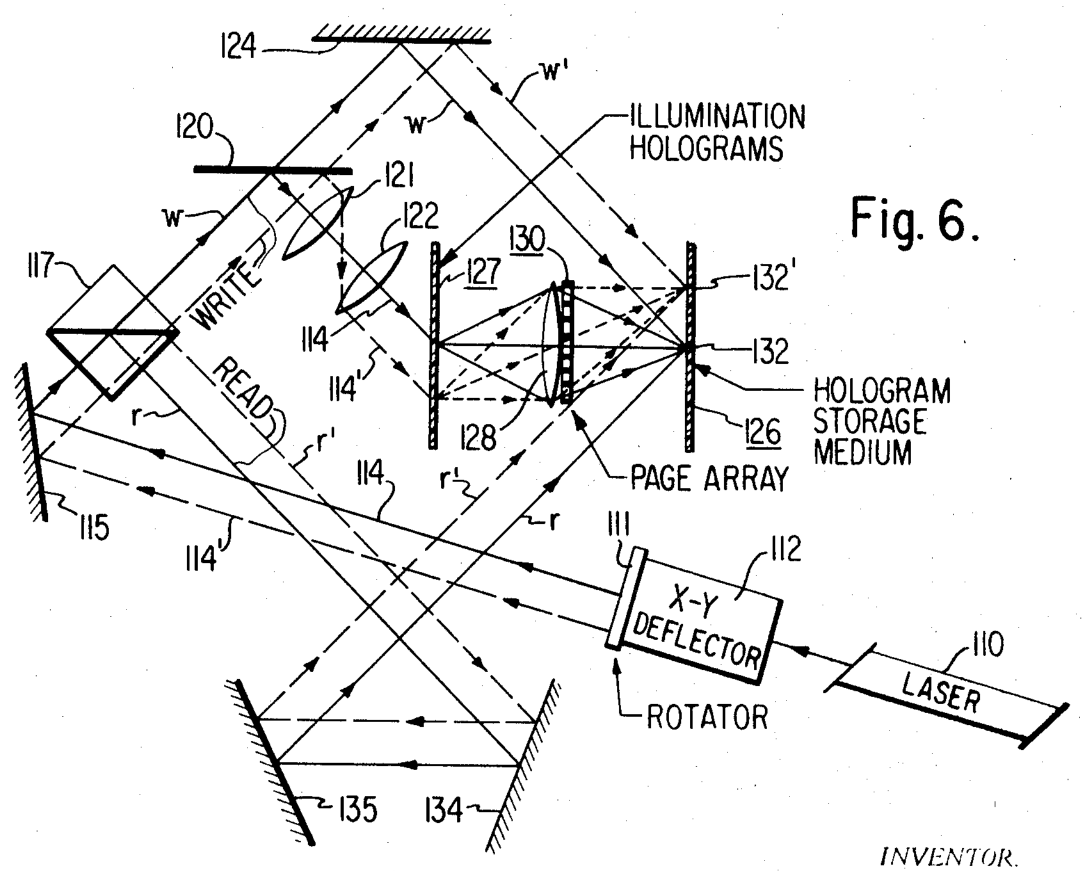
FIG. 6 is a diagram of an electronic-optic memory system including the page array of memory units shown in FIG. 5.

Reference is now made to FIG. 6 for a description of the electronic-optical memory system including the page array 130 of memory units. The memory system shown includes a laser 110, a polarization rotator 111 and a beam deflector 112 including a X-direction deflector and Y-direction deflector. The laser 110 may be a conventional pulsed solid state laser operating in a single transverse mode to produce a polarized and well-collimated beam. The polarization rotator is a conventional device acting in response to electrical input signals to rotate the polarization of the received laser beam to one or the other of two different polarizations which are 90° apart. The polarization rotator 111 may be an electro-optic material such as potassium dihydrogen phosphate crystal having two electrodes. The polarization of an incident beam is rotated 90° when a suitable voltage is applied to the electrodes.

The X-Y beam deflector 112 may be known digital light deflector operating in response to electrically induced acoustic waves in a transparent liquid or solid medium. Alternatively, the deflector 112 may be a known digital light deflector including stages of polarization rotators each followed by a doubly-refracting birefringent crystal such as calcite.

The deflected light beam from the laser 110 may be along any one of the paths 114 or 114′ or any other path. The deflected beam, after being reflected by a path-folding mirror 115, is directed to a polarizing prism 117, which reflects light beams having a "read" polarization *r* to mirrors 134 and 135 and on to a holgraphic storage medium 126. The polarizing prism 117 transmits light beams having a "write" polarization *w* to a beam splitter 120. The path from the polarizing prism 117 is determined by the read or write electrical energization of the polarization rotator 111.

The polarizing prism 117 is a known component which may be constructed of two triangular birefringent crystals of the same material arranged together with different orientations of their optical axes. Or, the polarization prism 117 may be constructed of a birefringent crystal slab immersed in a liquid having an appropriate refractive index. The beam splitter 120 is a known component which may be a partially silvered mirror.

The erasable holographic storage medium 126 may be constructed of a two-millionths of an inch thick layer of manganese bismuth deposited on an oriented substrate such as mica or sapphire. The assembly is initially heated to form the manganese bismuth film into a single crystal and is later subjected to a strong magnetic field that forces all its magnetic atoms to line up with their north poles in one direction normal to the surface of the film. The direction of magnetization at elemental areas on the film can be changed where optical energy from a laser impinges and generates heat. This is called Curie point writing or recording. If the optical pattern thus recorded in the magnetic condition of the film is a phase hologram, a "read" reference beam directed to the film is reflected with a polarization rotation due to the magneto-Kerr effect which causes a recreation of the optical image at a utilization plane. Alternatively, readout can be accomplished by Faraday-effect magneto-optic rotation of a reference beam transmitted through the manganese bismuth film. The "read" reference beam is made to be of intensity less than the "write" beam so that the recorded hologram is not destroyed. Alternatively, the "read" reference beam can be made to have a sufficiently high intensity to provide destructive readout. That is, the hologram is erased in the process of reading out the optically stored information.

The beam splitter 120 reflects a portion such as one-half of the received light beam, and transmits the remainder of the received light beam. The transmitted portion of the received light beam follows a path to mirror 124 and thence to a small area on the erasable holographic storage medium 126. The described path is a path for reference beam *w* used for creating a hologram on the storage medium 126. The mirror 124 is included in the path of the reference beam for the purpose of directing the reference at an appropriate angle, such as 30° or 45°, to the surface of the holographic storage medium 126.

The portion of the light beam which is reflected by the beam splitter 120 is directed through lenses 121 and 122 to an array 127 of illumination holograms, each of which is constructed to diverge or spread out a received narrow beam to illuminate a page array 130 of binary memory units. A page lens 128 is inserted near the page array 130 to converge or concentrate the spread-out light to a small area on the holographic storage medium 126. For example, the central undeflected beam 114 impinging on an illumination hologram 129 in the array 127 of illumination holograms is spread out within a conical or pyramidal solid volume to the page lens 128 and page array 130 of memory units, from which the light is concentrated through a solid conical or pyramidal volume so that the light reaches a small area 132 on the holographic storage medium 126. Similarly, when the deflected light beam 114′ impinges on a hologram in the array 127, the beam is spread out within a conical or pyramidal volume to the page lens 128 and page array 130, from which the light is converged to a small area 132′ on the holographic storage medium 126.

Some of the components described are included for the purpose of compensating for the image reversal caused by a plane mirror. It should be remembered that at any given time the light beam follows a single one of the two illustrated paths, or a single other path. In addition, since the beam is deflected in both the X- and Y-directions, the beam may follow a path which is below the plane of the paper, or above the plane of the paper, on which FIG. 6 is drawn.

The array 127 of illumination holograms consists of a number of individual phase holograms, one of which at a time is illuminated by an incident light beam. When the incident light beam is undeflected and follows the path 114, the hologram 129 is illuminated, and the light emerging from the hologram 129 illuminates the entire area of the page array 130 of binary memory units. Actually, the illumination hologram 129 is constructed using the array of light values in the page array 130 of memory units as an object so that, in use, the illumination hologram 129 illuminates solely the light valves in all of the discrete memory units in the page array 130, and does not waste light on spaces between the light valves. When the beam directed to the array of holograms 127 is deflected so that it illuminates a different individual hologram 129', the page array 130 of individual memory units is similarly illuminated.

The page array 130 of memory units in an integrated array of electrical and optically accessible memory units. Each memory unit may include a bistable transistor flip-flop, a photodiode operating in response to light to set the corresponding flip-flop, and a light valve controlled by the state of the flip-flop to pass or disperse light in accordance with the state of the flip-flop. The construction of the page array 130 of memory units was described in greater detail in connection with FIGS. 1 through 5.

Light passing through light valves in the page array 130 is directed to a small area 132 on the holographic storage medium 126. That is, an optical image of the page array of light valves appears at the area 132 with light spots from unenergized light valves, and an absence of light spots from energized light valves which have scattered the incident light. A hologram of the page array of light valves is created in the area 132 by the cooperative action of the "write" reference light beam *w*. The information contained in the hologram 132 is later recovered and transferred back to the page array 130 of memory units by the action of a "read" reference beam *r*. The read reference beam *r* illuminates the hologram 132 and produces be reflection an optical image at the page array 130 of the previously recorded page array of light valves. That is, the original image of the array of light valves is recreated on, and illuminates, the array of photosensors included in the page array 130 of memory units. In this way the flip-flops in the page array 130 of memory units are simultaneous set to values representing the binary information originally stored electrically in the page array 130.

Figure 2:
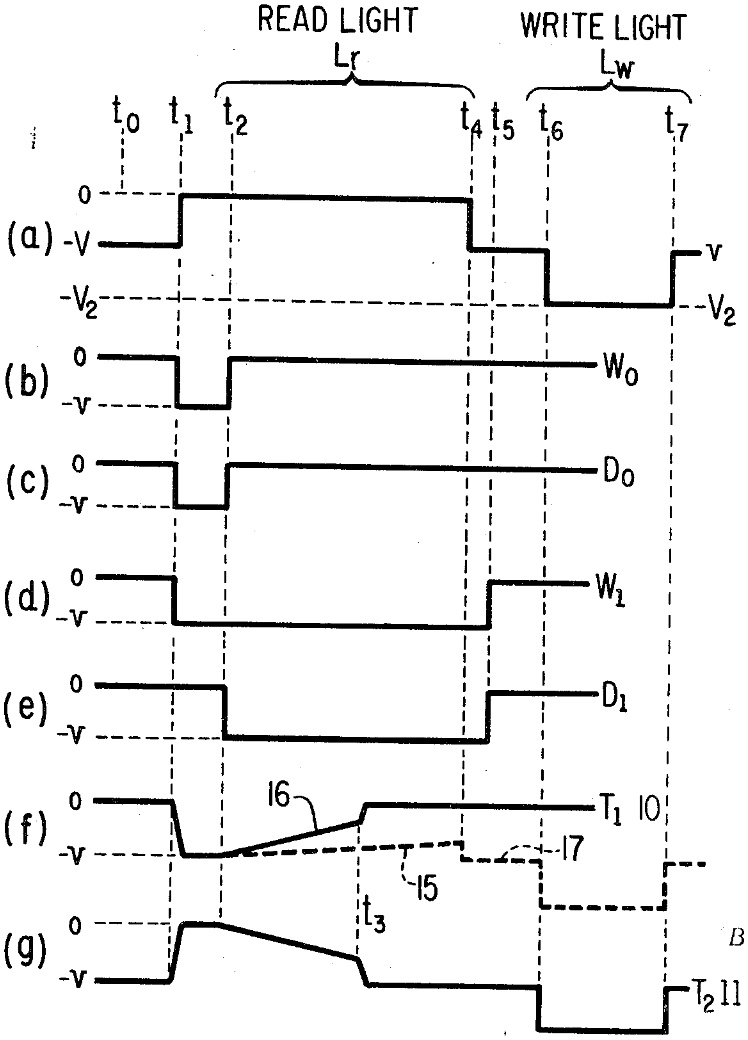
FIG. 2 is a chart of voltage waveforms which will be referred to in describing the operation of the circuit of FIG. 1.

Information can be optically transferred from the holographic storage medium 126 to all of the memory units MU simultaneously when the photodiodes herein are enabled by an electrical energization shown by waveforms of FIG. 2. The information stored in all memory units MU can, at a later time, be simultaneously transferred optically to the holographic storage medium 126.

As used herein, the words "electrical write" and "electrical read" refer to electrical writing into, and reading out from, the electrical semiconductor memory in the page array 130. These transfers are between the page array 130 and a computer processor. The words "write" and "read" refer to optical writing (recording) on, and reading (reproducing) from, the optical storage medium 126. These transfers are between the page array 130 and the optical storage medium 126.

Figure 7:
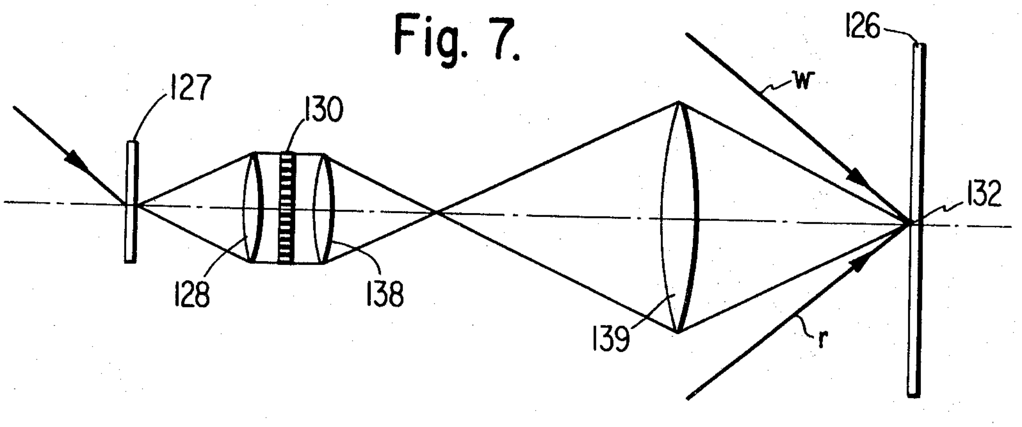
FIG. 7 is an alternative arrangement of a portion of the system of FIG. 6.

FIG. 7 shows an alternative arrangement which may be employed in the system of FIG. 6 between the array 127 of illumination holograms and the holographic storage medium 126. In FIG. 7, additional lenses 138 and 139 are interposed an the page array 130 and the storage medium 126. The additional lenses are designed and arranged to produce an effective magnification of the page array 130. That is, the image of the page array 130 appears at the lens 139 in magnified form prior to being projected as a very small image at the small area 132 on the storage medium 126. The optical arrangement shown in FIG. 7 is also advantageous in that the light passing to and through the page array 130 in both directions is collimated by lenses 128 and 138.

The liquid crystal light valve that has been described herein employs a liquid crystal material which is transparent in the absence of an electric field, and which disperses incident light when subjected to an electric field. The light valve need not block the incident light when electrically energized. Dispersion of the light is sufficient to prevent the recording of a holographic image in the area 132 of the storage medium 126 as shown in FIGS. 6 and 7. This is because only an insignificant amount of dispersed light reaches the small area 132 on the storage medium 126. Furthermore, the MnBi storage medium 126 is characterized in being insensitive to light below a given threshold.

The liquid crystal material 30 may alternatively be a composition which absorbs light in the presence of an electric field, rather than the type which disperses light in the presence of an electric file. The liquid crystal composition may include a dichomric dye which changes its light-absorbing characteristics for light of the wavelength supplied by the laser 110.

According to another alternative, the liquid crystal light valve may be constructed to cause a rotation of the polarization of incident light, rather than a dispersion or an absorption of the light. The rotation of polarization of light by an energized liquid crystal light valve prevents the recording of a hologram on the holographic storage medium 126. This is so because, in holographic recording, the object beam and the reference beam must have the same polarization. Therefore, when such an electro-optic liquid crystal light valve is sued, the holographic storage medium records light passed through unenergized light valves but does not record light passed through light valves which are energized to cause a rotation of the light.

The optical arrangement shown in FIG. 7 is particularly useful with a page array 130 utilizing electro-optic liquid crystal light valves. The advantage results from the collimated condition of light passing through the page array due to the presence of collimating lens 128 and 138. Compensation can be made for the different angles at which the collimated light passes through the page array 130 due to light originating from different points on the array 127 of illumination holograms. The necessary compensation can be provided by appropriately varying the $-V_2$ voltage, shown in FIG. 2*a*, applied to all of the memory units in the array 130. Alternatively, the compensation can be accomplished by changing the ground side of all of the light valves LV to an appropriate potential.

Figure 8:
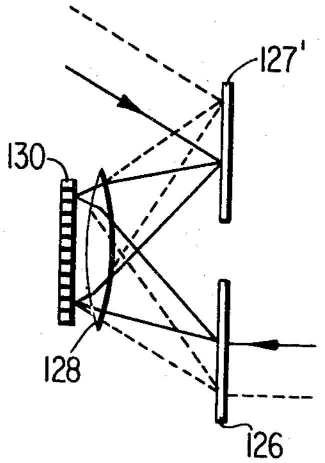
FIG. 8 is another alternative arrangement of a portion of the system of FIG. 6.
Figure 9:
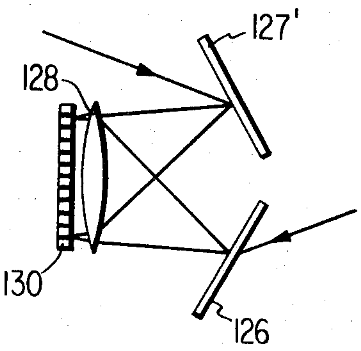
FIG. 9 is a variation of the arrangement shown in FIG. 8.

FIGS. 8 and 9 show optical systems for use with page arrays 130 which include liquid crystal light valves LV constructed for operation in the light reflection mode, rather than the light transmission mode. The arrangements shown in FIGS. 8 and 9 also differ from the previously described arrangements in employing a reflecting-type illumination hologram 127' in place of the transmission-type illumination hologram 127. The liquid crystal light valves in the page array 130 of FIGS. 8 and 9 reflect light from the same side of the array that receives light. FIG. 9 differs from FIG. 8 simply in that the illumination hologram 127' and the holographic storage medium 126 are given optically more effective orientations in relation to the page array 130.

The light-transmitting type of page array is generally preferable to the light-reflecting type. When the page array is constructed using the bulk silicon MOS technology as illustrated in FIG. 4, the N-type silicon 20, if about 4 mils thick, transmits about 50 percent of an infrared incident light beam having a wavelength of 1.1 microns. The laser 110 can be conveniently made to provide light of this frequency. The remaining 50 percent of the light not transmitted through the bulk silicon 20 is absorbed in the N-type silicon 20 and the P-type silicon 22'. This absorption of light in the material is necessary for operation of the photodiode, which has a PN junction between materials 20 and 22'. Therefore, it is necessary to balance the light-transmitting characteristic of the silicon under the liquid crystal light valve 30 with the light-absorbing characteristics of the silicon which is necessary for operation of the coextensive photodiode.

If the page array is constructed using the known silicon-on-sapphire technology in place of the bulk silicon technology shown in FIG. 4, the page array may be operated in the light-transmitting mode using visible light, because sapphire is transparent to visible light. In this case, the N-type and the P-type silicon layers on the sapphire may be given appropriate thicknesses to ensure a sufficient amount of light absorption for the proper operation of the photodiode constituted thereby.

If the page array should be used in a light-reflecting mode as illustrated in FIGS. 8 and 9, the page array can be constructed using the bulk silicon technology shown in FIG. 4, and the light used can be visible light because the utilized light is reflected from, rather than transmitted through, the silicon. The P-type material 22′ of the photodiode inherently causes reflection of about 30 percent of incident visible light. The proportion of light reflected can be increased by depositing a partially reflecting metal film on the layer 22′ before the liquid crystal material 30 is positioned.

OPERATION OF THE MEMORY SYSTEM

The operation of the entire memory system will now be described. The page array 130 of memory units MU includes a conventional, electrically and randomly accessible semiconductor memory. Binary information is electrically written into all of the memory units of the page array by conventional memory accessing circuits. This is normally accomplished a word at a time in the usual manner under the control of a computer central processor. The information electrically written into the memory units is retained by the flip-flops FF in the memory units.

The information electrically stored in the flip-flops of the page array 130 is then transferred as a hologram onto one of many small areas on the holographic storage medium 126. The particular small area selected for the storage of the page of information is determined by the amount of X- and Y-deflection given to the light beam from the laser 110. If the central area 132 of the holographic storage medium 126 is to receive the holographic image of the page array, no deflection of the laser beam by the deflector 112 is needed.

When the information in the page array 130 is to be recorded on, or written onto, the holographic storage medium 126, the laser beam is given a polarization by the polarization rotator 111 which is assigned to the "write" condition. The laser beam, when polarized in the "write" direction, and when undeflected, follows the path 114 directly through the polarizing prism 117 to the beam splitter 120. The portion of the light beam reflected by the beam splitter 120 impinges on an illumination hologram in the array 127 of illumination holograms and is thereby caused to fan out within a conical (or pyramidal shaped) volume which illuminates the page array 130 of memory units.

The illumination holograms in the array 127 of illumination holograms are preferably constructed so that only the light valves of the memory units are illuminated, to the exclusion of the spaces between light valves where the light would otherwise be wasted. The light valves in the array 130 of memory units are at this time conditioned to pass or block incident light depending on state of the corresponding flip-flop in the memory unit.

To conserve power, the light valves are operated in accordance with the state of the corresponding flip-flops only at the moment when the laser beam is pulsed "on" for optical writing purposes. The pattern of light spots created by the open and closed light valves is projected onto the small area 132 on the holographic storage medium 126.

A holographic reference beam $w$ is simultaneously directed to the same small area 132 on the medium 126. The reference beam is constituted of the portion of the beam transmitted by beam splitter 120 and following a path $w$ through mirror 124 to the small area 132 on holographic storage medium 126. The interfering action of the page array object beam from page array 130 and the reference beam $w$ produces a page hologram at the small area 132 on the medium 126. The thus-recorded page hologram remains on the manganese bismuth storage medium until it is intentionally erased. Erasure of a single page hologram on the medium 126 can be accomplished by illuminating the hologram, with a light intensity lower than needed for Curie point writing, in the presence of a magnetic field having an intensity too low to erase nonilluminated page holograms.

The page array hologram which has been described as being formed at the small area 132 on the holographic medium 126 could have been recorded at any other selected position on the medium 126 by appropriately controlling the X- and Y-deflection imparted to the laser beam by the deflector 112.

When it is desired to retrieve and utilize the page of information stored as a hologram in the small area 132 of the medium 126, a "read" energization is given to polarization rotator 111 and the laser 110 is pulsed. The deflector 112 is set to not deflect the beam in either of the X- or Y-direction. The beam 114, having the "read" polarization is reflected by the polarizing crystal 117 to the path $r$ through mirrors 134, and 135, to the small area 132 on the holographic storage medium 126. The angle at which the beam strikes the hologram 132 is exactly the conjugate of the angle of the beam $w$ used when the hologram was written.

The read beam $r$ impinging on the hologram at 132, causes light to be reflected in a conical pyramidal shaped volume back to the photodiodes on the page array 130 of memory elements. The electrical outputs of the photodiodes respond to the received light pattern to set the corresponding flip-flops FF in the corresponding memory units in accordance with the image recreated from the hologram 132 on the medium 126. Thereafter, with the flip-flops FF in the page array 130 retaining the digital information, the information can be read out electrically, a word at a time, and utilized by an associated computer processor.

The herein disclosed electrically and optically accessible memory system includes a page array of memory units each including a bistable semiconductor storage element, a photodiode and a light valve. The intimate physical grouping of each storage device, a photodiode and light valve in the page array eliminates optical registration problems encountered in constructions having physically separated devices. The array of photodiodes used to read out a hologram recorded on the optical storage medium is in perfect registry with the array of light valves used to initially write or record the hologram. This is so because each photodiode and associated light valve are constructed to be in overlapped coextensive relationship. The effectiveness and efficiency of the illumination hologram 127 can be ensured by using the page array of light valves as the object, together with system optics such as lens 128, when creating the illumination hologram 127. While the described memory system employs holographic optics, the page array of memory units is also useful in systems employing conventional optics.

While the invention has been described as useful in a holographic memory system, the page array of memory units herein described is also useful in viewing-type display systems and in projection-type display systems, in addition to other types of memory and computer systems.

What is claimed is:

1. The combination of an integrated planar array of electrically and optically accessible memory units, each memory unit including a semiconductor bistable storage element, and a light valve responsive to the output of said bistable storage element and operative to control the passage of incident light.

2. The combination defined in claim 1 wherein said light valve is a liquid crystal light valve.

3. The combination defined in claim 2 wherein said liquid crystal light valve controls the passage through said planar array of said incident light.

4. The combination defined in claim 2 wherein said liquid crystal light valve controls the reflection from said planar array of said incident light.

5. The combination defined in claim 2 wherein said liquid crystal light valve includes a light scattering liquid crystal.

6. The combination defined in claim 2 wherein said liquid crystal light valve includes a light-absorbing liquid crystal.

7. The combination defined in claim 2 wherein said liquid crystal light valve includes a light-polarization-rotating liquid crystal.

8. The combination defined in claim 7, and in addition, an optical system including collimating lenses on both sides of said array of memory units.

9. The combination of an integrated planar array of electrically and optically accessible memory units, each memory unit including a semiconductor bistable storage element, a photosensor responsive to light and having an output connected to a set input of said bistable storage element and a light valve responsive to the output of said bistable storage element and operative to control the passage of incident light.

10. The combination defined in claim 9 wherein said photosensor and said light valve are constructed to be in substantially coextensive overlapping relationship.

11. The combination defined in claim 10 wherein said light valve is a liquid crystal light valve.

12. The combination defined in claim 11 wherein said photosensor is a PN-diode and wherein one of the P- and N-layers of the diode constitutes one electrode of said liquid crystal light valve.

13. The combination as defined in claim 12 wherein the other electrode of said liquid crystal light valve is constituted by a transparent conductive sheet.

14. The combination as defined in claim 12 wherein said integrated planar array is covered with a layer of liquid crystal material confined in place by a transparent conductive sheet electrode, and in addition, a light mask having opening coextensive with said photodiodes.

15. The combination defined in claim 10, and in addition, optical means on one side of said array of memory units including means to direct indecent light at an acute angle therewith to said light valves from which the light may be reflected at an angle of reflection, and means to direct light to said photosensors at said angle of reflection 16. The combination defined in claim 15 wherein said optical means includes a lens positioned to pass both incident and reflected light.

* * * * *

UNITED STATES PATENT OFFICE

CERTIFICATE OF CORRECTION

Patent No. 3,631,411 Dated December 28, 1971

Inventor(s) Walter Frank Kosonocky

It is certified that error appears in the above-identified patent and that said Letters Patent are hereby corrected as shown below:

Column 1, line 7, "," should read ---.---; line 18, after "necessary" insert ---to---; line 30, "element" should read ---elements---; line 45, delete "a circular diagram of"; line 57, "electronic-optic" should read ---electronic-optical---; line 68, after "flip-flop" insert ---and---; line 70, after "$T_1$" insert ---and---; line 73, "a" second occurrence, should read ---the---; line 75, "of" should read ---or---.

Column 2, line 1, "The transistors $T_1$ and $T_2$" should read ---The transistors $T_1$ through $T_4$ are MOS (metal oxide semiconductor) field effect transistors. Each transistor includes, as shown in relation to transistor $T_2$---; line 2, "and" should read ---through---; line 4, "a n" should read ---an---; line 5, "of" second occurrence, should read ---for---; line 6, after "bit" insert ---into the memory cell and reading out an information bit---; line 8, "since" should read ---sense---; line 19, after "$T_1$" insert ---.---; line 19, "gate" should read ---Gate---; line 31, delete "as"; line 38, after "drains" insert ---.---; line 55, delete "of" (first occurance).

UNITED STATES PATENT OFFICE
CERTIFICATE OF CORRECTION

Patent No. 3,631,411 Dated December 28, 1971

Inventor(s) Walter Frank Kosonocky

It is certified that error appears in the above-identified patent and that said Letters Patent are hereby corrected as shown below:

Column 3, line 40, after "the" insert ---turbid---.

Column 4, line 7, "composition" should read ---compositions---; line 35, after "the" insert ---page---.

Column 5, line 18, "$w_1$." should read ---$w_1$,---; line 24, "O" should read ---0---; line 68, after "be" insert ---a---.

Column 7, line 11, "values" should read ---valves---; line 19, "in" should read ---is---; line 51, "herein" should read ---therein---; line 68, "an" should read ---between---.

Column 8, line 18, "file" should read ---field---; line 30, "sued" should read ---used---; line 34, after "the" insert ---polarization of the---.

Column 10, line 30, after "conical" insert ---or---.

Column 12, line 12, "opening" should read ---openings---; line 16, "indecent" should read ---incident---; line 19, after "reflection" insert ---.---.

Signed and sealed this 24th day of October 1972.

(SEAL)
Attest:

EDWARD M.FLETCHER,JR.
Attesting Officer

ROBERT GOTTSCHALK
Commissioner of Patents

)RM PO-1050 (10-69)
30 6|72

USCOMM-DC 60376-P69
☆ U.S. GOVERNMENT PRINTING OFFICE 1969 O—366-334